United States Patent
Kim

(10) Patent No.: US 8,465,994 B2
(45) Date of Patent: Jun. 18, 2013

(54) METHOD FOR FABRICATING ACTIVE-MATRIX DISPLAY DEVICE

(75) Inventor: Tae-Sung Kim, Incheon (KR)

(73) Assignee: Samsung Display Co., Ltd., Yongin (KR)

(*) Notice: Subject to any disclaimer, the term of this patent is extended or adjusted under 35 U.S.C. 154(b) by 1531 days.

(21) Appl. No.: 11/068,902

(22) Filed: Mar. 2, 2005

(65) Prior Publication Data

US 2005/0196911 A1 Sep. 8, 2005

(30) Foreign Application Priority Data

Mar. 4, 2004 (KR) .................. 10-2004-0014743

(51) Int. Cl.
*H01L 21/00* (2006.01)

(52) U.S. Cl.
USPC ............................................. 438/34

(58) Field of Classification Search
USPC ..................... 438/754, 34; 257/72
See application file for complete search history.

(56) References Cited

U.S. PATENT DOCUMENTS

| | | | |
|---|---|---|---|
| 5,714,407 A * | 2/1998 | Maeno et al. ............. | 438/701 |
| 6,190,934 B1 * | 2/2001 | Kang et al. ............... | 438/30 |
| 6,724,011 B2 * | 4/2004 | Segawa et al. ............ | 257/72 |
| 6,787,809 B2 * | 9/2004 | Hong et al. ............... | 257/72 |
| 7,041,522 B2 * | 5/2006 | Tanaka et al. ............. | 438/30 |
| 2002/0086240 A1 * | 7/2002 | Petersson et al. ........ | 430/311 |
| 2003/0060056 A1 * | 3/2003 | Park et al. ............... | 438/754 |
| 2007/0164289 A1 * | 7/2007 | Jung ....................... | 257/72 |
| 2009/0026463 A1 * | 1/2009 | Kang et al. ............... | 257/72 |
| 2011/0073864 A1 * | 3/2011 | Liu et al. ................. | 257/59 |
| 2011/0074749 A1 * | 3/2011 | Higashi ................... | 345/206 |
| 2011/0136277 A1 * | 6/2011 | Park et al. ............... | 438/34 |
| 2011/0143470 A1 * | 6/2011 | Lee ......................... | 438/34 |
| 2011/0244615 A1 * | 10/2011 | Fang et al. ............... | 438/34 |
| 2012/0313121 A1 * | 12/2012 | Kim ........................ | 257/88 |

FOREIGN PATENT DOCUMENTS

| | | |
|---|---|---|
| KR | 10-2000-0047013 | 7/2000 |
| KR | 1020020045256 A1 | 6/2002 |

* cited by examiner

*Primary Examiner* — Jae Lee
*Assistant Examiner* — Grant Withers
(74) *Attorney, Agent, or Firm* — H.C. Park & Associates, PLC

(57) ABSTRACT

A method for fabricating a display device having a thin film transistor. When forming wirings and electrode patterns made of a metal layer on a mother substrate, the metal wiring and the electrode patterns are patterned and, simultaneously, the metal layer within a predetermined range of the outermost region of the mother substrate is removed. Removing the metal layer in the outermost region of the mother substrate when patterning the metal layer may obtain stability in the process of fabricating the display device and lower a device failure rate, thereby increasing productivity.

11 Claims, 6 Drawing Sheets

METHOD FOR FABRICATING ACTIVE-MATRIX DISPLAY DEVICE

CROSS-REFERENCE TO RELATED APPLICATION

This application claims priority to and the benefit of Korean Patent Application No. 10-2004-0014743, filed Mar. 4, 2004, which is hereby incorporated by reference for all purposes as if fully set forth herein.

BACKGROUND OF THE INVENTION

1. Field of the Invention

The present invention relates to a method for fabricating a display device capable of ensuring process stability by removing a metal layer existing in an outermost region of a mother substrate when forming metal patterns.

2. Discussion of the Background

Generally, display devices may be passive or active-matrix devices. A passive-matrix display device does not include thin film transistors (TFTs), while an active-matrix display device does. A passive-matrix display device may be easily fabricated, but it consumes a lot of power, and it is difficult to make it in large sizes. Hence, passive-matrix devices are more useful for small-sized displays. Therefore, active-matrix display devices may be preferred when fabricating large displays.

A conventional active-matrix display device typically includes a plurality of signal lines, such as gate lines for transmitting scan signals and data lines for transmitting data signals.

Further, data pad portions of the data lines may be placed on one side of the mother substrate, and gate pad portions of the gate lines may be placed on an adjacent side. These pad portions may further include electrodes, such as input and output terminals, to apply external power supply and electrical signals.

A pixel region is located at an intersection of the signal lines. The pixel region may comprise one or more TFTs having a semiconductor layer, a gate electrode and source/drain electrodes, a storage portion, which may comprise a lower electrode, an insulating layer, and an upper electrode formed adjacent to a power line and the gate line, and a pixel portion. The pixel portion, which displays an image, may comprise a liquid crystal cell or an organic electroluminescence element.

FIG. 1 is a plan view showing an arrangement of an active-matrix display device. In the display device, a selected region is designated in the form of a reticle on a mother substrate 100, and then each layer is sequentially formed. Some layers, such as an insulating layer, may be formed on the entire surface of the mother substrate 100 without requiring additional patterning. On the other hand, signal lines, such as the data lines, the power line and the gate lines, data pad portions, gate pad portions, the TFT semiconductor layer, the gate electrode, the source/drain electrodes, the upper and lower electrodes of the storage portion, and a plurality of other metal wirings may require several patterning processes using masks.

A conventional patterning process uses a photolithography process, in which a metal layer to be patterned is formed on the entire surface of the mother substrate, and photoresist PR, which is a photosensitive or etching material, may be deposited on the metal layer. After exposure and development steps, wet or dry etching may be performed using the photoresist as a mask.

FIG. 2A, which is an enlarged plan view of the region A of FIG. 1, shows an exemplary mask design after depositing photoresist PR on a metal layer 120 in a sub-display device 110. First, a positive photoresist may be deposited on the entire surface of the mother substrate 100, and a photoresist PR pattern may be obtained by illuminating an exposure shot into a selected region a of the sub-display device 110 using a mask. An etching process may then be performed to obtain a metal pattern. When etching with the positive photoresist, the metal layer is not removed in a region where the photoresist pattern is formed, but it is removed in a region where the photoresist pattern is not formed. In the above patterning process, the exposure and patterning processes are not performed in an outermost region b of the mother substrate 100, so that the metal layer on the mother substrate 100 at the outermost region b remains even after forming the metal pattern.

FIG. 2B, which is a cross-sectional view taken along the line I-I' of FIG. 2A, shows the metal pattern obtained by exposure and etching processes. Referring to FIG. 2B, when forming a desired metal pattern in the selected region a, the metal pattern also remains in the outermost region b of the mother substrate 100. The metal pattern in the outermost region b may eventually be cut or removed after final processing.

However, the metal pattern remaining in the outermost region b may not adhere to the mother substrate 100 as strongly as the metal pattern formed in the selected region a. Since distortion of the mother substrate 100 determines stress applied to the metal layer 120, stress applied per unit area may increase towards the substrate's outer region b, which may cause the relatively weaker adhesion of the deposited metal layer 120 in the outermost region b.

FIG. 3 is a cross-sectional view showing how the metal layer 120 might be lifted off of the mother substrate 100. As FIG. 3 shows, high stress may strip part of the metal layer 120 in the outermost region b from the mother substrate 100. Consequently, the metal layer 120 may attach to a surface of a sub-display device 110 in the mother substrate 100, thereby causing a defect such as a short circuit. Further, the deposited metal layer 120 may be single or multi-layered, comprising different types of metal depending on a resistance value, work function and correlation with the electrode of the wiring. Considering the adhesion between different types of metal, the lift off of the metal layer 120 may become more serious. Consequently, the TFT fabrication process may become more unstable, thereby increasing a failure rate of when fabricating display devices.

This problem may worsen when performing multiple patterning processes to form a plurality of signal lines, a pad portion, a gate electrode, source/drain electrodes and a plurality of metal wirings.

Moreover, the photoresist may also increase the stress of the metal layer in the outermost region b. Generally, the photoresist may be deposited by spin coating, and the photoresist in the outer portion b may be deposited about 150 to 200% thicker than desired. This increased thickness may cause undesired photoresist to remain in the outermost region b, even after subsequent exposure and etching processes. Hence, photoresist residue may attach to the surface of the TFT in a subsequent process and may increase the stress applied to the metal layer formed in the outermost region b. Therefore, the metal layer 120 in the outermost region b may be stripped off during a semiconductor fabrication process, which may cause product failure.

For the reasons noted above, it is desirable to reduce defects, occurring during device fabrication, involving a metal layer in the outermost region of the mother substrate.

SUMMARY OF THE INVENTION

The present invention provides a method for stabilizing a fabrication process of a display device, thereby reducing a failure rate and increasing productivity.

Additional features of the invention will be set forth in the description which follows, and in part will be apparent from the description, or may be learned by practice of the invention.

The present invention discloses a method for fabricating a display device having a plurality of gate lines and data lines on a substrate to define a plurality of pixel portions, a plurality of gate pad portions and data pad portions coupled to the plurality of gate lines and data lines, respectively, and at least one thin film transistor arranged in each pixel portion. The method comprises forming a metal pattern and simultaneously removing a metal layer in an outermost region of the substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Exemplary embodiments of the present invention will now be described with reference to the accompanying drawings.

Figure 1:
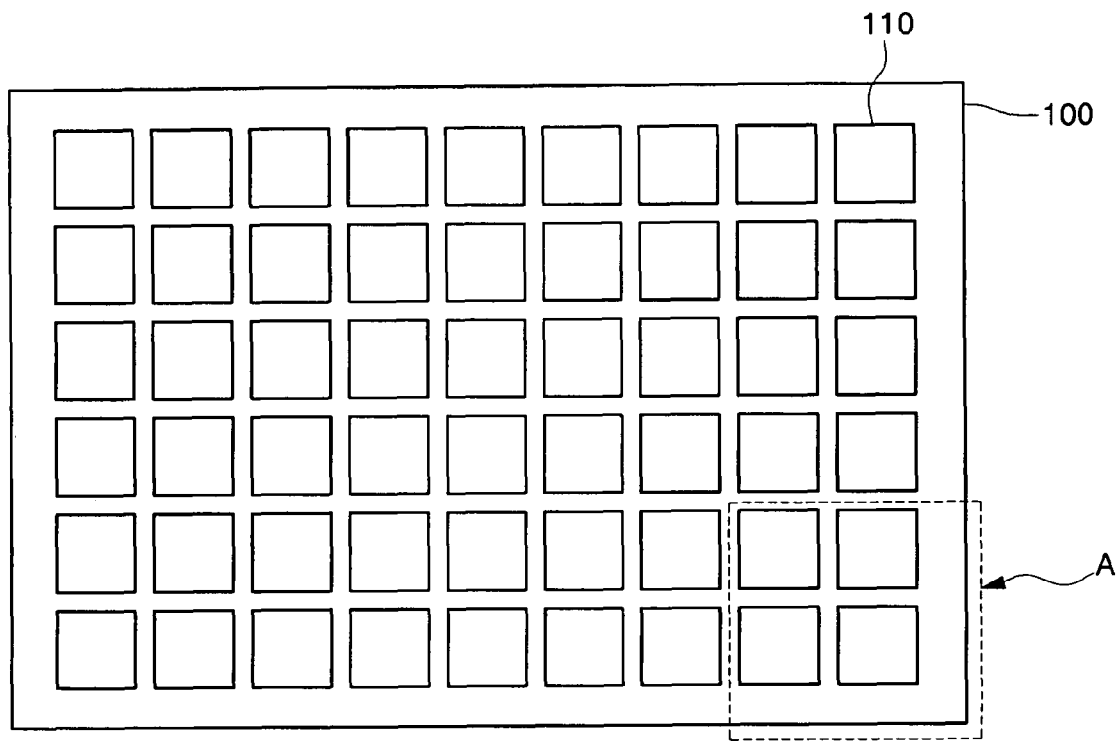
FIG. 1 is a plan view showing the arrangement of a sub-display device on a mother substrate.
Figure 2A:
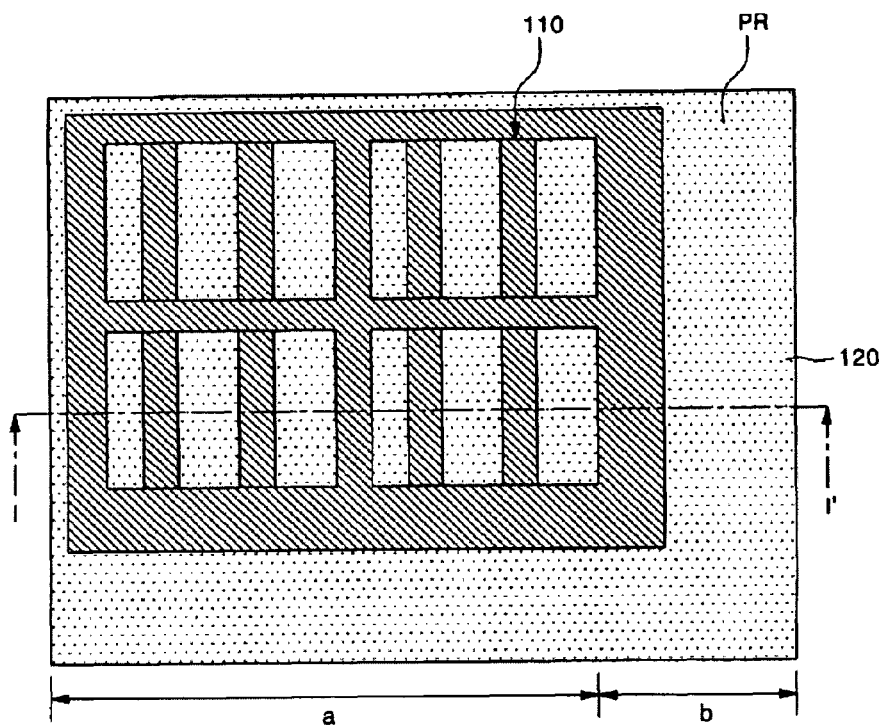
FIG. 2A is an enlarged plan view of the region A shown in FIG. 1.
Figure 2B:
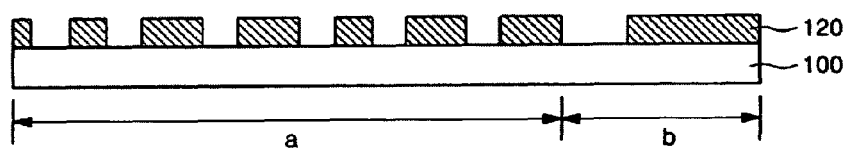
FIG. 2B is a cross-sectional view taken along the line I-I' of FIG. 2A.
Figure 3:
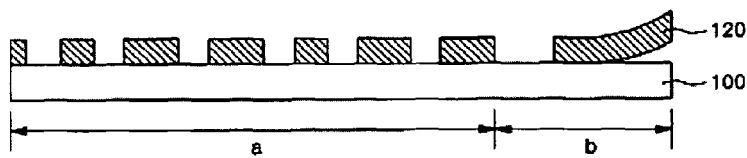
FIG. 3 is a cross-sectional view showing a lift-off problem of a metal layer remaining in the outermost region b of FIG. 2B.
Figure 4:
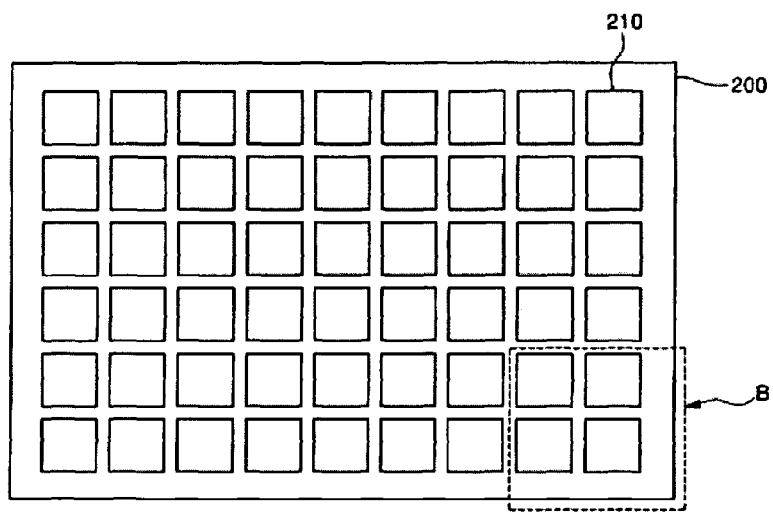
FIG. 4 is a plan view showing the arrangement of a display device according to an exemplary embodiment of the present invention.

FIG. 4 is a plan view showing the arrangement of a display device according to an exemplary embodiment of the present invention. The display device includes sub-display devices 210 defined in the form of a reticle on a mother substrate 200. Each of the sub-display devices 210 may include a gate line and a data line intersecting each other to define a pixel region, which comprises a TFT, a capacitor, and a pixel portion P. An electroluminescence display device is made with the pixel portion P including an electroluminescence element, while a liquid crystal display device is made with the pixel portion P including a liquid crystal cell.

Figure 5A:
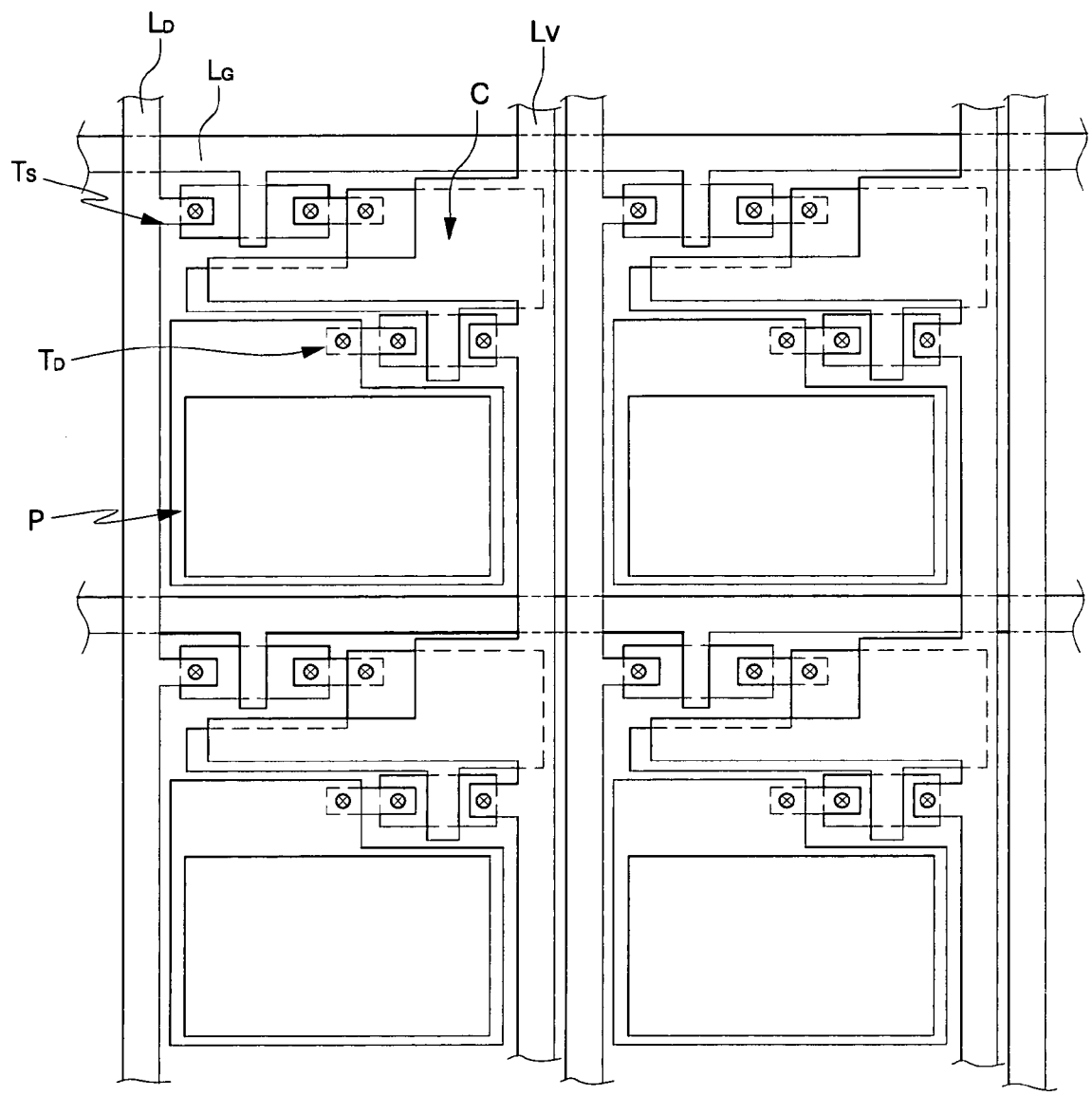
FIG. 5A is a plan view showing wiring of an organic electroluminescence display device.

FIG. 5A is a plan view showing wiring of an organic electroluminescence display device. Referring to FIG. 5A, the electroluminescence display device may include a transparent substrate, a plurality of signal lines arranged in a matrix on the substrate, and a pixel portion P formed at an intersection region of the signal lines.

The signal lines include a data line $L_D$, which applies a data voltage, a power line $L_V$ formed adjacent to, and in parallel with, each data line $L_D$ and to which power is always applied while driving the electroluminescence element of the pixel portion P, and a gate line $L_G$, which crosses the data line $L_D$ and the power line $L_V$, and applies ON/OFF signals to the TFT $T_S$.

The pixel portion P in the intersection region of the data line $L_D$, the power line $L_V$ and the gate line $L_G$ includes a switching TFT $T_S$, a driving TFT $T_D$, a storage portion C and an electroluminescence element P.

Figure 5B:
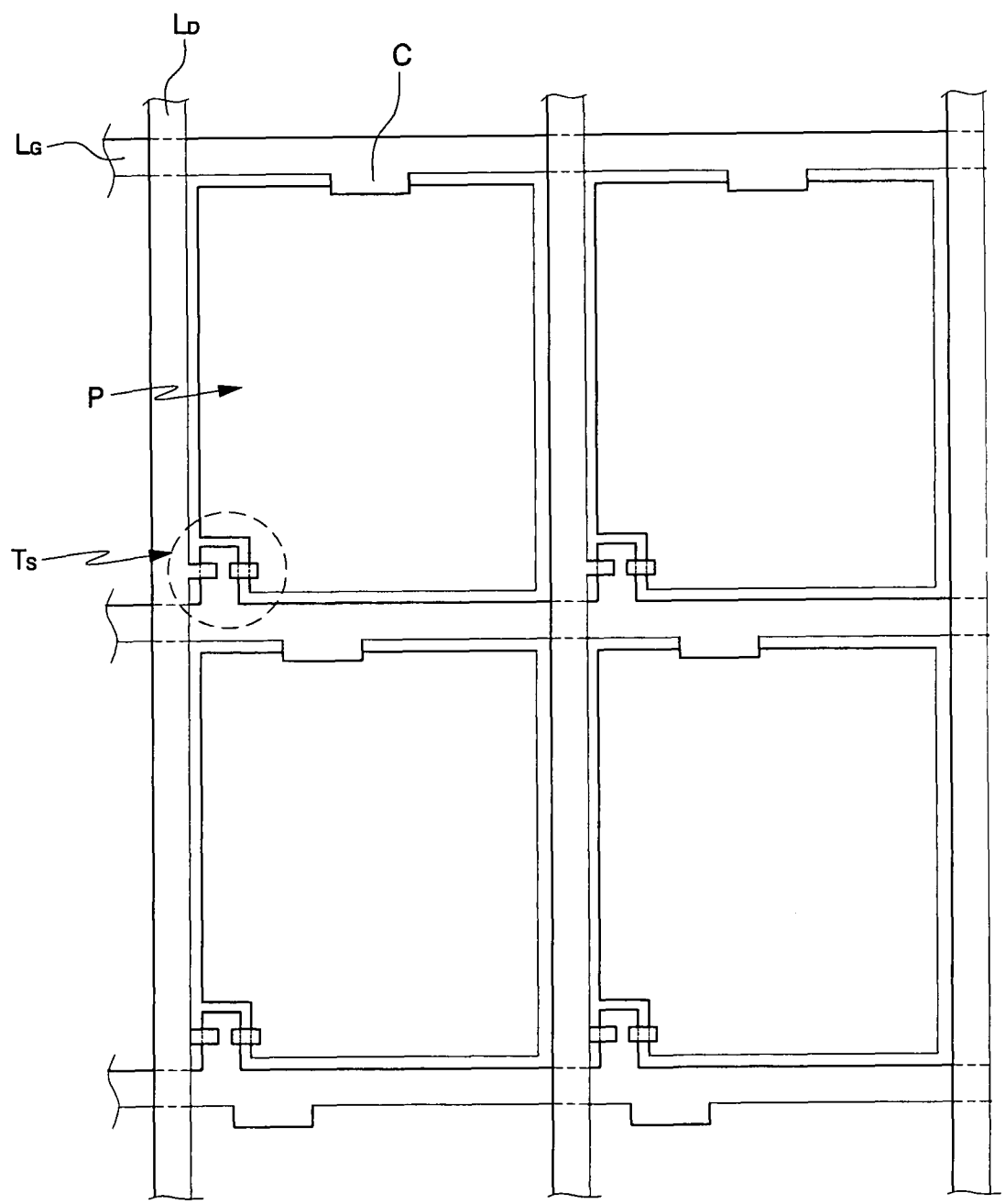
FIG. 5B is a plan view showing wiring of a liquid crystal display device.

FIG. 5B is a plan view showing wiring of a liquid crystal display device. In a liquid crystal display device, a liquid crystal is interposed between two insulating substrates. A switching TFT $T_S$ and a pixel electrode may be formed on one insulating substrate, and a power line $L_V$ and a common electrode may be formed on the other.

Referring to FIG. 5B, the insulating substrate comprising the switching TFT $T_S$ and the pixel electrode may also include a plurality of data lines $L_D$ and gate lines $L_G$ arranged in a matrix. The switching TFT $T_S$, the pixel electrode and a storage portion C may be disposed in the intersection region of the signal lines, like the organic electroluminescence display device.

The electroluminescence display device and the liquid crystal display device described above may include at least one TFT having a semiconductor layer, a gate electrode and source/drain electrodes in each pixel portion P, and a pixel electrode in the pixel portion P.

A relation between wirings and electrodes, made of metal layers, of the above display devices may be simply described as follows: a gate electrode may be placed at a portion of the gate line in a protruded and extended form, a source electrode may be coupled to the data line, and a drain electrode may be coupled to the pixel electrode of the pixel portion. Further, the capacitor may be formed at one side of the gate line, and it may include a portion of the gate line as a lower electrode, an insulating layer acting as a dielectric, and a separate upper electrode to store charges together with the pixel electrode. Additionally, a data pad portion coupled to the data line may be placed on one side of the mother substrate, and a gate pad portion coupled to the gate line may be placed on an adjacent side of the mother substrate.

The above-mentioned wirings, such as the gate line $L_G$, the data line $L_D$ and the power line $L_V$, and electrodes, such as the gate pad electrode, the data pad electrode, the gate electrode, the source electrode, the drain electrode and the storage electrode, may be made of metal layers, which may require a patterning process in which photolithography and etching processes are performed using a mask.

A method of fabricating a display device according to an exemplary embodiment of the present invention will now be described with reference to FIG. 4, FIG. 6A and FIG. 6B. A non-limiting exemplary embodiment of the present invention includes a top-gate TFT with the pixel electrode formed thereon.

Referring to FIG. 4, a mother substrate 200 is prepared to form a display device, and a region to be formed as a sub-display device 210 is designated in the form of a reticle. The mother substrate 200 may be made of glass, quartz, plastic, or other like materials.

Next, a semiconductor layer may be formed of amorphous silicon or polysilicon on the entire surface of the mother substrate 200. The semiconductor layer may be patterned in an island form through a photolithography process using a first mask.

A gate insulating layer may then be formed of a silicon nitride ($SiN_x$) layer, a silicon oxide ($SiO_x$) layer, or other like materials, using a deposition method such as plasma enhances chemical vapor deposition (PECVD), on the entire surface of the mother substrate 200 having the semiconductor layer.

Subsequently, metal may be deposited to cover up to the edge of the mother substrate 200 to form a first metal pattern having a gate electrode on the gate insulating layer. Here, the metal may be a single metal, such as Mo, Al or Cr, or an alloy, such as MoW and AlNd, and it may be formed as a single layer or a double layer.

According to an exemplary embodiment of the present invention, a metal layer at the outermost region of the mother substrate 200 may be removed when forming the first metal pattern. Specifically, a photoresist may be deposited on the metal layer over the entire mother substrate 200, and a photoresist pattern may then be formed in a first metal pattern region having the gate electrode using a second mask. Next, the photoresist pattern, in which the photoresist at the outermost region of the mother substrate 200 is removed, is formed using a third mask, and the first metal pattern is formed by etching, while simultaneously removing the metal layer at the outermost region of the mother substrate 200.

Figure 6A:
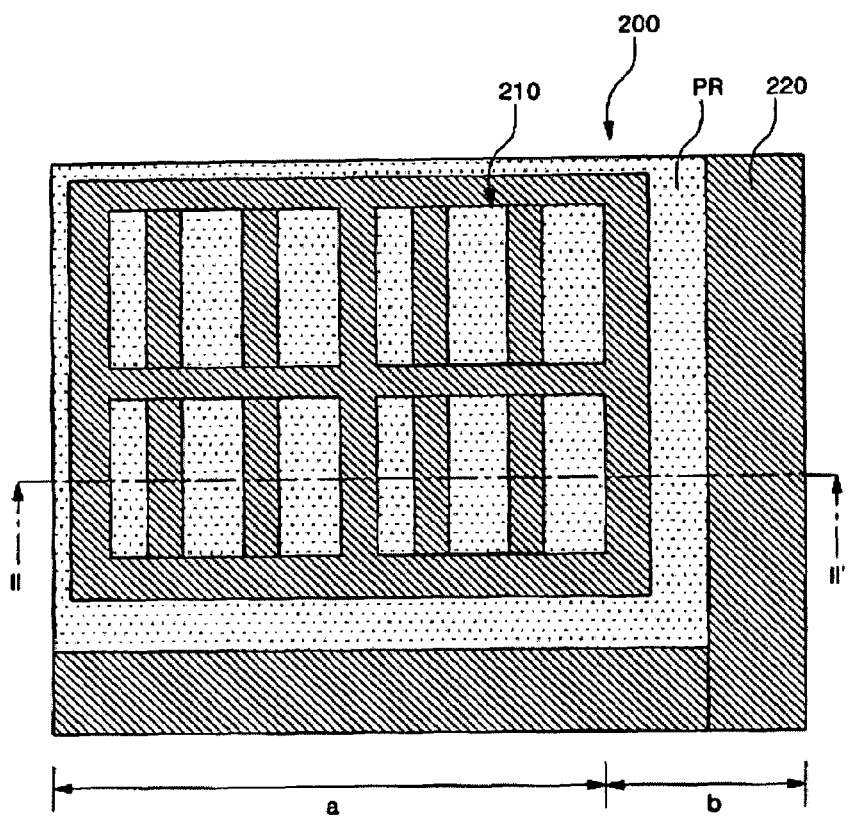
FIG. 6A is an enlarged plan view of the region B shown in FIG. 4.

FIG. 6A, which is an enlarged plan view of the region B shown in FIG. 4, shows a mask design according to photoresist PR deposited on a metal layer of a sub-display device 210. Referring to FIG. 6A, photoresist PR may be deposited on the metal layer 220 over the entire mother substrate 200, and a photoresist pattern may then be formed by typical baking, exposure and developing processes. When using a positive photoresist, the exposed region reacts with, and is removed by, a developer, thereby forming a pattern by allowing the exposed region of photoresist to be removed. A region where the photoresist pattern is not formed may be removed in the subsequent etching process.

In particular, the exposure of the exemplary embodiment includes an exposure shot using a second mask at a selected region, i.e., a region other than the gate electrode, and the photoresist pattern is formed by a development process. The exposure shot may also be applied using a third mask to a predetermined portion of the outermost region b of the mother substrate 200, and then the photoresist pattern is formed by the development process.

Next, using the photoresist patterns, a first metal pattern may be formed in the selected region a by performing typical wet or dry etching, and a metal layer within a predetermined distance from the edge of the outermost region b of the mother substrate 200 is removed. The etching process may be performed using conventional wet or dry etching processes, such as ion beam etching, RF sputtering etching, and reactive ion etching (RIE).

Figure 6B:
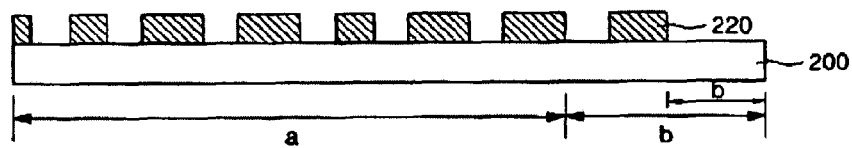
FIG. 6B is a cross-sectional view taken along the line II-II' of FIG. 6A.

FIG. 6B, which is a cross-sectional view taken along the line II-II' of FIG. 6A, shows the arrangement of the first metal pattern after etching. Referring to FIG. 6B, the first metal pattern having a gate electrode is formed in a selected region a, and simultaneously, the metal layer in a portion b" of the outermost region b of the mother substrate 200 is etched.

The metal layer in the portion b" of the outermost region b may be weakly adhered to the mother substrate 200, so that it may be easily lifted or stripped off the substrate during subsequent processes. Therefore, if left on the substrate, it may attach to a surface of a sub-display device 210, which may lead to a defect such as a short circuit. According to an exemplary embodiment of the present invention, the metal layer that exists within a range of a potential defect region, preferably within 10 mm, and more preferably within 5 mm from the edge of the outermost region b of the mother substrate 200, may be removed to address the foregoing problems.

In addition to the gate electrode, the first metal pattern may include a gate line, a storage electrode and a gate pad electrode. The gate line, the storage line and the gate pad electrode may be formed in the same manner as the gate electrode, and a patterning process may be performed using an additional mask.

Next, an interlayer insulating layer may be formed by depositing an insulating material, such as $SiO_x$ or $SiN_x$, over the entire mother substrate 200 to cover the first metal pattern. A contact hole and a via hole, which expose a predetermined region of a lower semiconductor layer, may be formed in the interlayer insulating layer through photolithography and etching processes using a fourth mask.

The contact hole and the via hole may then be filled with metal when the metal is deposited on the entire surface of the mother substrate 200 using a sputtering method, a vacuum deposition method, or other like methods. The metal may be Mo, Ti, Ta, Al and Cr, or an alloy such as MoW and AlNd.

The deposited metal layer may be patterned with photolithography and etching processes using fifth and sixth masks to form a second metal pattern having source and drain electrodes, and the metal layer within a predetermined distance from the edge of the outermost region b of the mother substrate 200 is removed. The formation of the second metal pattern and the removal of the metal layer may be performed in the same manner as described above.

Specifically, the metal layer is formed on the entire surface of the mother substrate 200 to obtain the second metal pattern, and a positive photoresist is deposited thereon. Next, after baking, in a portion other than a region in which a second metal pattern having the source electrode and the drain electrode of the selected region a is to be formed, an exposure shot is illuminated using a fifth mask, and a photoresist pattern is formed by the development process, as shown in FIG. 6A.

The exposure shot may also be illuminated onto the portion b" of the outermost region b using a sixth mask, and a photoresist pattern is obtained in which the photoresist formed in the portion b" is removed by the development process.

Next, the etching process may be performed using the obtained photoresist pattern to form the second metal pattern, and simultaneously, the metal layer that exists in the portion b" of the outermost region b is etched and removed. Here, like with the first metal pattern, the etching may be performed up to the metal layer that exists within 10 mm, preferably within 5 mm, from the edge of the outermost region b of the mother substrate 200.

The second metal pattern may include a data line, a data pad electrode, and source/drain electrodes, and the signal lines and the metal electrodes may be formed by patterning while the source/drain electrodes are formed. When the display device is an organic electroluminescence display device, the second metal pattern may further include the power line. On the other hand, when the display device is a liquid crystal display device, the power line and the common electrode may be formed on an insulating substrate not including a TFT.

An interlayer insulating layer may then be formed on the second metal pattern over the entire mother substrate 200, and the interlayer insulating layer may be etched to form a contact hole exposing one of the source/drain electrodes. Next, a pixel electrode, which may be coupled to one of the source/drain electrodes, preferably, the drain electrode, may be formed through patterning. When the pixel electrode is formed of metal, the metal layer in the portion b" of outermost region b of the mother substrate 200 may be removed as describe above.

Specifically, when the display device employs a top emission structure, the pixel electrode may be a reflective electrode formed by depositing and patterning metal with acceptable reflection efficiency. For example, a transparent electrode, such as Indium Tin Oxide (ITO) or Indium Zinc Oxide (IZO), may be stacked on an Al or Al—Nd reflective layer, or a single-layer or multi-layer structure may be made of at least one selected from a group consisting of Ni, Pt, Au, Ir, Cr and oxides thereof.

The reflection electrode may be formed by successively depositing two types of metal on the mother substrate 200 and patterning the deposited metal by photolithography and etching processes using a mask. When the metal layer is etched, the metal layer in a portion b" of the outermost region b may be simultaneously removed.

Next, an insulating layer may be formed on the pixel electrode and patterned to form an opening exposing the pixel electrode. An organic emission layer or a liquid crystal cell may then be formed over the pixel electrode, and an upper electrode corresponding to the pixel electrode is formed to complete the display device.

If the display device is bottom emitting, the upper electrode may be a reflection electrode, and at least one metal selected from the group consisting of Al, Al—Nd, Ni, Pt, Au, Ir, Cr and oxides thereof may be deposited on the entire surface of the substrate and patterned to form the upper electrode. In this case, when metal layer forming the upper electrode is etched, the metal layer in a portion b" of the outermost region b may be simultaneously removed.

The exemplary embodiment of the present invention has been described in connection with a TFT having a top-gate structure and a display device having a pixel portion on the TFT. When the display device is fabricated, the metal layer within a predetermined distance b" from the edge of the outermost region of the mother substrate is removed, thereby stabilizing the process of fabricating the display device.

Further, for metal pattern layers having a first metal pattern such as a gate electrode, a gate line, a storage electrode and a gate pad electrode, and a second metal pattern such as a data line, a power line, a source line, a drain line and a data pad electrode, although the exemplary embodiment of the present invention has been described in connection with a display device having a TFT with a top-gate structure, the above metal pattern layers may also be applied to a TFT with a bottom-gate structure.

Furthermore, additional metal patterns may be included, and the electrodes and the wirings may be formed in different layers. In this case, the metal layer in the outermost region of the mother substrate may also be removed, thereby stabilizing the process of fabricating the display device.

Here, the mask used to remove the metal layer on the edge of the substrate was, for convenience sake, briefly illustrated in the exemplary embodiment of the present invention. Its size and form may change, e.g., by way of layout and exposure design of the sub-display device, and may be appropriately designed by those skilled in the art.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a display device having a plurality of gate lines and data lines on a mother substrate to define a plurality of pixel portions, a plurality of gate pad portions and data pad portions coupled to the plurality of gate lines and data lines, respectively, and at least one thin film transistor arranged in each pixel portion, the method comprising:
    forming a metal pattern in the pixel portion simultaneously with removing a metal layer along an edge of the mother substrate.

2. The method of claim 1, wherein the metal layer to be removed is within 10 mm from the edge of the mother substrate.

3. The method of claim 1, wherein the metal layer to be removed is within 5 mm from the edge of the mother substrate.

4. The method of claim 1, further comprising removing the metal layer with an etching process after forming a photoresist pattern.

5. The method of claim 4, wherein the etching process is a wet etching process or a dry etching process.

6. The method of claim 1, wherein forming the metal pattern includes forming a gate electrode, a gate line, a gate pad electrode, and a storage electrode.

7. The method of claim 1, wherein forming the metal pattern includes forming a source electrode, a drain electrode, a data line, a data pad electrode and a power line.

8. The method of claim 1, wherein forming the metal pattern includes forming a reflective electrode.

9. The method according to claim 1, wherein the metal pattern comprises Mo, Ti, Ta, Al, Cr, MoW, or AlNd.

10. The method according to claim 1, wherein the pixel portion includes a liquid crystal cell or an organic electroluminescence element.

11. The method according to claim 1, wherein the metal layer that exists along the edge of the mother substrate is simultaneously removed while forming the metal patterns by an etching process after forming a photoresist pattern using an additional mask.

* * * * *